United States Patent
Tanigawa et al.

(10) Patent No.: US 6,283,531 B1
(45) Date of Patent: Sep. 4, 2001

(54) VEHICLE INCLUDING ELECTRIC FOLDING ROOF

(75) Inventors: Masahiro Tanigawa; Masanobu Shinoda, both of Wako; Jun Odahara; Tsuguo Hoshikawa, both of Tokyo, all of (JP)

(73) Assignees: Honda Giken Kogyo Kabushiki Kaisha; Mitsui Kinzoku Kogyo Kabushiki Kaisha, both of Tokyo (JP)

( * ) Notice: Subject to any disclaimer, the term of this patent is extended or adjusted under 35 U.S.C. 154(b) by 0 days.

(21) Appl. No.: 09/633,215

(22) Filed: Aug. 7, 2000

(51) Int. Cl.[7] .................................................. B62D 25/06
(52) U.S. Cl. ...................................... 296/103; 117/107.01
(58) Field of Search .............................. 296/117, 107.01, 296/103

(56) References Cited

U.S. PATENT DOCUMENTS

| | | | | |
|---|---|---|---|---|
| 4,634,171 | * | 1/1987 | McKeag | 296/117 |
| 4,749,193 | * | 6/1988 | Hacker | 296/117 |
| 4,766,356 | * | 8/1988 | Handa et al. | 296/117 |
| 5,042,868 | * | 8/1991 | Nothaft et al. | 296/117 |
| 5,279,119 | * | 1/1994 | Shelhart et al. | 296/117 |
| 5,533,777 | * | 7/1996 | Kleemann et al. | 296/117 |
| 5,785,375 | * | 7/1998 | Alexander et al. | 296/117 |
| 5,839,778 | * | 11/1998 | Schaible et al. | 296/107.01 |
| 6,036,254 | * | 3/2000 | Ritter et al. | 296/107.01 |
| 6,042,174 | * | 3/2000 | Durrani | 296/117 |
| 6,149,221 | * | 11/2000 | Mentink | 296/117 |

FOREIGN PATENT DOCUMENTS

| | | | | |
|---|---|---|---|---|
| 38267879 | * | 2/1990 | (DE) | 296/117 |
| 0302476 | * | 2/1989 | (EP) | 296/117 |
| 401041419 | * | 2/1989 | (JP) | 296/117 |
| 0109725 | * | 4/1990 | (JP) | 296/117 |

\* cited by examiner

*Primary Examiner*—Joseph D. Pape
*Assistant Examiner*—Kiran B. Patel
(74) *Attorney, Agent, or Firm*—Merchant & Gould P. C.

(57) ABSTRACT

A vehicle comprises a vehicle body, an electric folding roof housed in the vehicle body in a folded state, an electric motor operate to unfold the folded electric folding roof, and a rigid roof designed to be attached to the vehicle body when the electric folding roof is folded and housed in the vehicle body. The vehicle also includes an inhibiting device for inhibiting operation of the electric motor upon detection of the attachment of the rigid roof to the vehicle body. With this arrangement, it becomes possible to prevent unfolding of the folded electric folding roof when the rigid roof is attached to the vehicle body. This leads to the further advantage that failure of the motor can be prevented.

3 Claims, 9 Drawing Sheets

VEHICLE INCLUDING ELECTRIC FOLDING ROOF

BACKGROUND OF THE INVENTION

1. Field of the Invention

The present invention relates generally to a vehicle including an electric folding roof, and more particularly to convertible including such a roof and designed to detect attachment of a detachable rigid roof (a so-called hardtop) thereto. 2. Description of the Related Art Convertibles or open cars have manually foldable roofs carried thereon. Such roofs are folded down when housed in vehicle bodies of the convertibles. The convertibles have detachable rigid roofs set thereon.

In recent years, there have been increased demands for easy-to-operate electric folding roofs, and hence many convertibles have such electric folding roofs carried thereon.

One example of the electric folding roofs is shown in (a) through (c) of FIG. 9 hereof.

Referring to (a) of FIG. 9, an electric folding roof 101 shown by a phantom line is unfolded for use as a roof of a convertible 100.

The roof 101 includes an upper part 102, side parts 103, a rear part 105 having a rear window 104 mounted thereon, and a mechanism (not shown) for automatically folding and unfolding; the roof 101. The mechanism includes a link for folding the roof 101 into a given configuration, an electric motor for driving the link, a folding switch and an unfolding switch. Both the folding and unfolding switches function to operate the electric motor. Reference numeral 106 denotes a windshield. Designated by reference numeral 107 is a vehicle body.

As shown by the phantom line in (a) of FIG. 9, the upper part 102 of the roof 101 has a front end portion thereof connected to an upper part of the windshield 106. The side parts 103 have lower end portions mounted on the vehicle body 107. Likewise, the rear part 105 has a lower end portion thereof mounted on the vehicle body 107.

When the folding switch is turned on with the roof 101 arranged as shown by the phantom line in (a) of FIG. 9, the electric motor operates.

Upon the operation of the electric motor, the upper part 102 is disconnected from the upper part of the windshield 106, and then moves upwardly and rearwardly of the convertible 100 as shown by a solid line in (a) of FIG. 9. During the upward and rearward movement of the upper part 102, a bending portion 108 of the upper part 102 is bent. The side parts 103 subsequently commence to contract while bending a bending portion 111 of the rear window 104 of the rear part 105.

As shown in (b) of FIG. 9, the bending portion 108 of the upper part 102 is further bent, whereby the upper part 102 moves more rearwardly. At this time, the side parts 103 further contract, and thus the bending portion 111 of the rear window 104 of the rear part 105 is also further bent. Therefore, the folding roof 101 is ultimately folded and housed in the vehicle body 107, as shown in (c) of FIG. 9.

When the unfolding switch is turned on with the roof 101 folded in the manner as stated above, the electric motor operates to unfold the roof 101 by reversing the sequence as described with reference to (a) through (c) of FIG. 9.

However, when the unfolding switch is accidentally turned on with a rigid roof 112 attached to the vehicle body 107, as shown by a phantom line in (c) of FIG. 9, and with the roof 101 folded and housed in the vehicle body 107, the electric motor operates to unfold the folding roof 101. In such a case, the electric motor may be overloaded and thereby fail.

SUMMARY OF THE INVENTION

An object of the present invention is to provide a vehicle which includes an electric folding roof folded and housed in a vehicle body thereof and which is capable of inhibiting the electric folding roof from unfolding when a detachable rigid roof is attached to the vehicle body.

According to an aspect of the present invention, there is provided a vehicle which comprises a vehicle body, an electric folding roof housed in the vehicle body in a folded state, an electric motor being operable to unfold the folded electric folding roof, a rigid roof designed to be attached to the vehicle body when the electric folding roof is folded and housed in the vehicle body, and an inhibiting means for inhibiting an operation of the electric motor upon detection of the attachment of the rigid roof to the vehicle body.

By virtue of the inhibiting means, it becomes possible to prevent unfolding of the folded electric folding roof when the rigid roof is attached to the vehicle body. This leads to the advantage that failure of the motor can be prevented.

Desirably, the inhibiting means comprises a hardtop detecting switch for detecting the attachment of the rigid roof to the vehicle body and outputting a detection signal, and a control unit for controlling, on the basis of the detection signal fed from the hardtop detecting switch, the electric motor such that the motor does not operate.

Preferably, the hardtop detecting switch is designed to be turned on by the attachment of the rigid roof to the vehicle body.

BRIEF DESCRIPTION OF THE DRAWINGS

A certain preferred embodiment of the present invention will hereinafter be described in detail, by way of example only, with reference to the accompanying drawings, in which.

DETAILED DESCRIPTION OF THE PREFERRED EMBODIMENT

The following description is merely exemplary in nature and is in no way intended to limit the invention, its application or uses.

Figure 1:
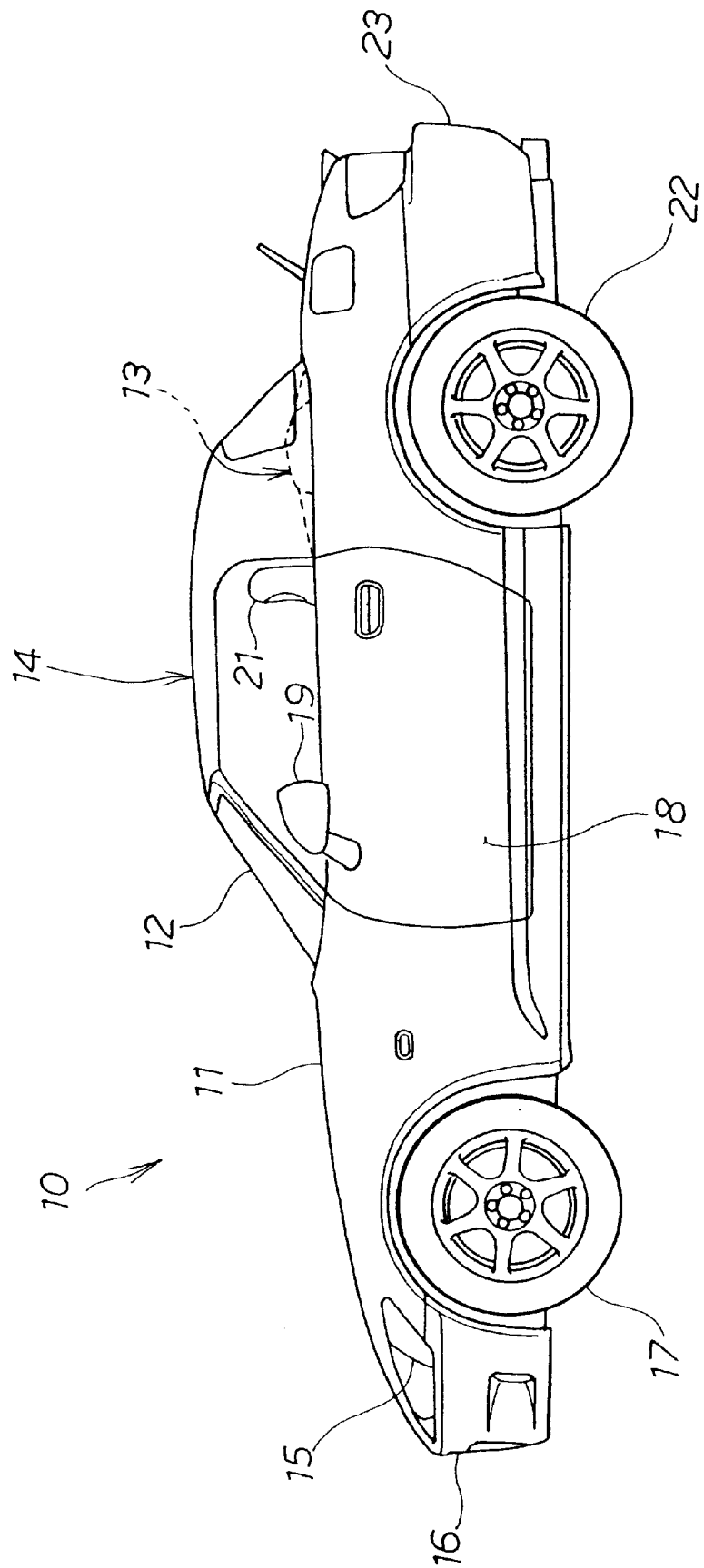
FIG. 1 is a side elevation view showing a vehicle including an electric folding roof, according to the present invention, with a hardtop attached thereto.

Referring to FIG. 1, a vehicle or a convertible 10 includes a vehicle body 11, a windshield 12 provided on an upper part of the vehicle body 11, and an electric folding roof 13 folded and housed in a rear part of the vehicle body 11. The vehicle body 11 has a detachable rigid roof 14 (hereinafter referred to as "hardtop 14") attached thereto. The hardtop 14 extends from the rear part of the vehicle body 11 to an upper end portion of the windshield 12 to thereby close a passenger compartment of the convertible 10. Reference numerals 15, 17, 18, 19, 21, 22 denote headlamps, front wheels, doors, outside mirrors, seats, and rear wheels, respectively. However, respective ones of the headlamps 15, the front wheels 17, the doors 18, the outside mirrors 19, the seats 21, and the rear wheels 22 are shown for simplicity. Designated by reference numerals 16, 23 are front and rear bumpers, respectively.

Figure 2:
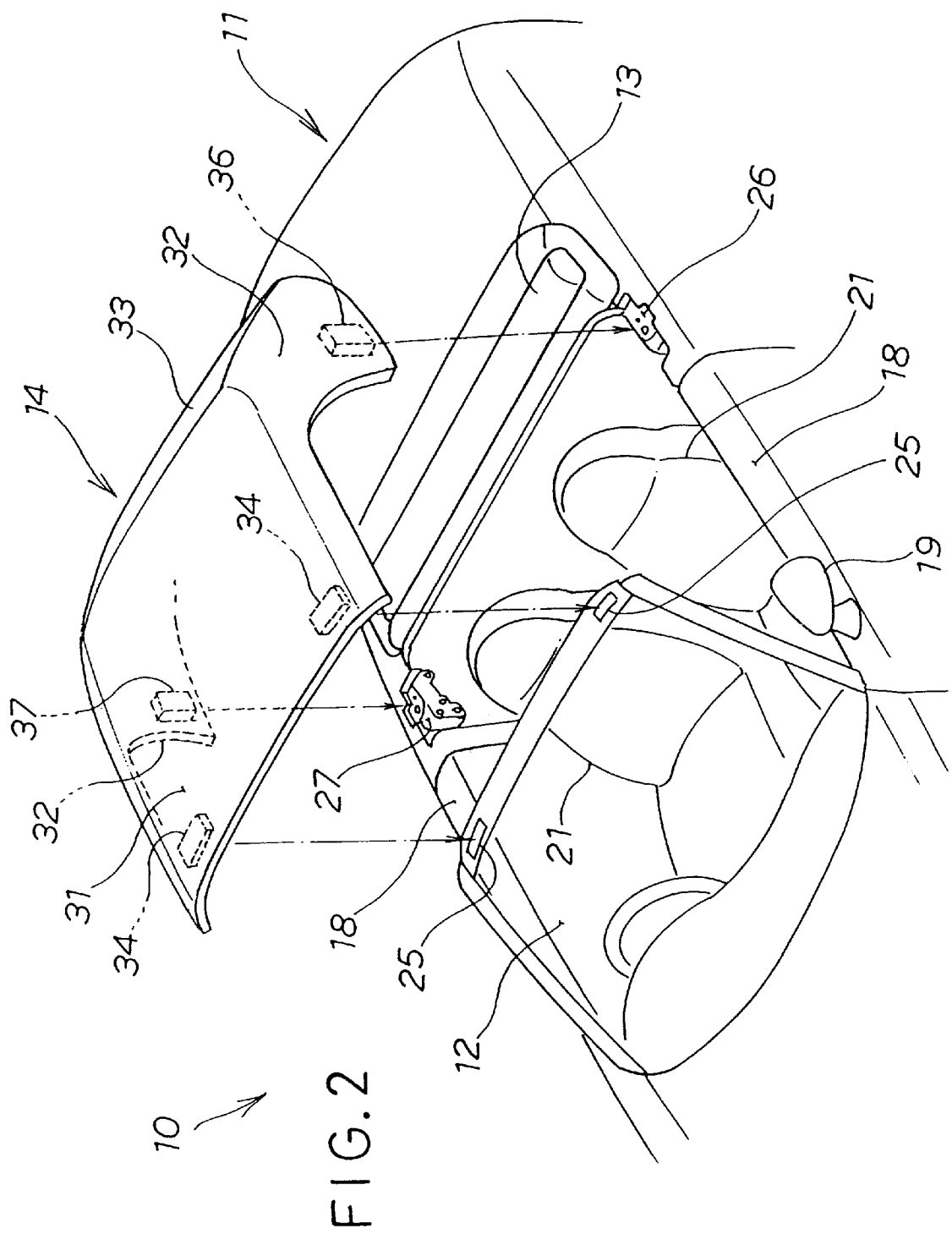
FIG. 2 is a perspective view of the vehicle and the hardtop shown in FIG. 1.

Reference is made to FIG. 2. The convertible 10 has front receiving portions 25, 25 provided at the upper end portion of the windshield 12, and rear receiving portions 26, 27 positioned rearwardly of the doors 18 and provided on the vehicle body 11. These front and rear receiving portions 25, 25, 26, 27 allow the hardtop 14 to be attached thereto with the roof 13 folded and housed in the vehicle body 11.

The convertible 10 also includes a link device (not shown) for folding and unfolding the roof 13 into predetermined configurations, and an electric motor 81 (shown in FIG. 7) for driving the link device.

The hardtop 14 includes a ceiling portion 31, side portions 32, 32 and a rear portion 33. The side portions 32, 32 and the rear portion 33 extend downwardly from a rear part of the ceiling portion 31. The ceiling portion 31 includes its front end portion having front locking mechanisms 34, 34 provided thereon. The front locking mechanisms 34, 34 are disposed in such a position that they are coupled to the front receiving portions 25, 25 of the windshield 12. At respective lower interior portions of the side portions 32, 32, there are provided rear locking mechanisms 36, 37. The rear locking mechanisms 36, 37 are disposed in such a position that they are coupled to the rear receiving portions 26, 27 of the vehicle body 11. The hardtop 14 is formed of, for example, light alloy.

The rear receiving portions 26, 27 are symmetrically disposed and identical in function and construction to each other. Similarly, the rear locking mechanisms 36, 37 are disposed in symmetric relation to each other and identical in function and construction to each other. Thus, the description of the rear receiving portion 26 and the rear locking mechanism 36 is omitted.

Figure 3:
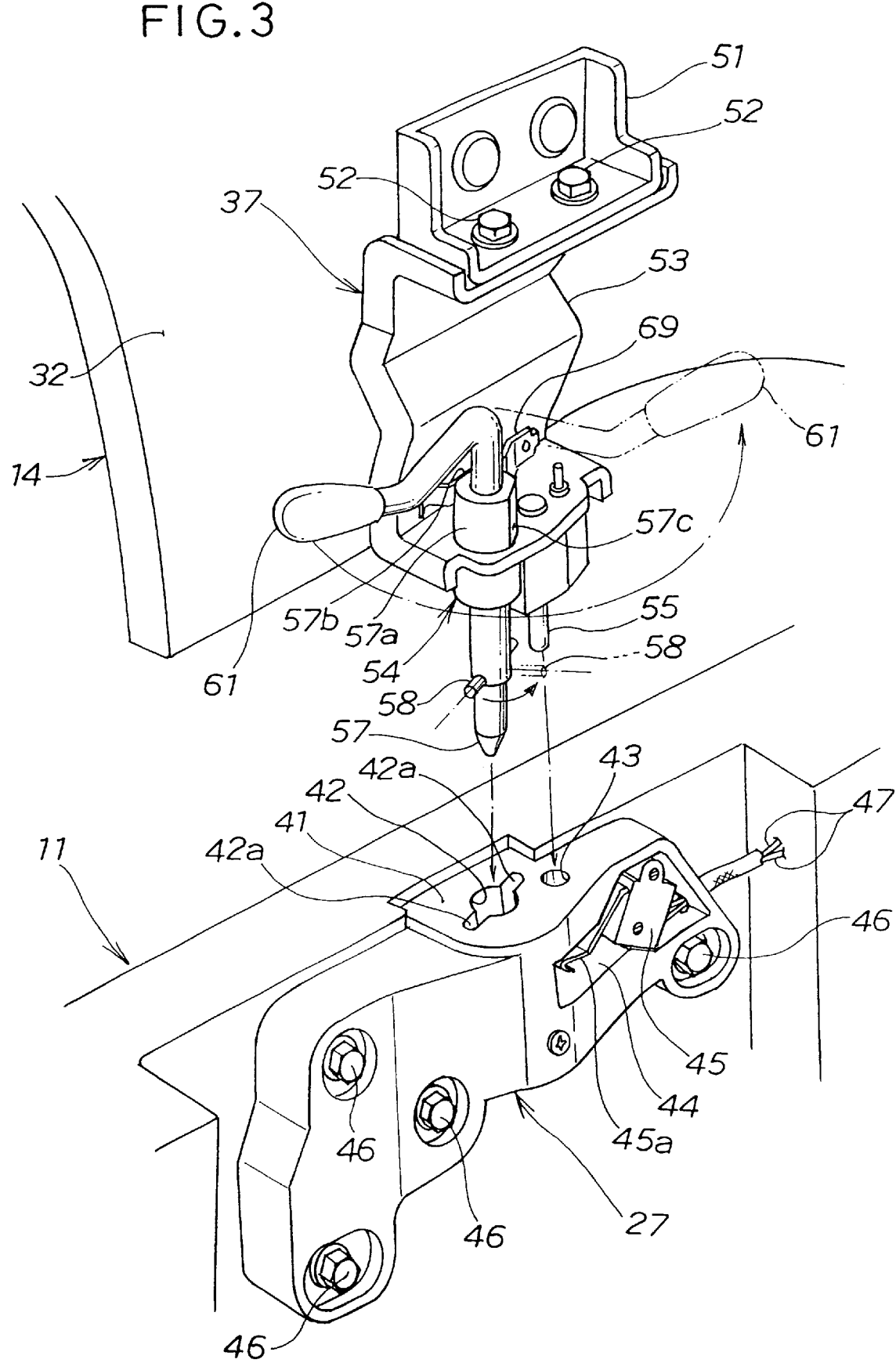
FIG. 3 is a perspective view of a rear locking mechanist of the hardtop and a rear receiving portion of the vehicle.

Turning to FIG. 3, the receiving portion 27 of the vehicle body 11 includes a coupling surface 41 against which the rear locking mechanism 37 is to be pressed. Formed in the coupling surface 41 are a lock hole 42, grooves 42a, 42a communicating with the lock hole 42, and a longitudinal hole 43 positioned proximally of the lock hole 42 and the grooves 42a, 42a. The rear receiving portion 27 includes its side surface having a recessed portion 44 formed therein. Received in the recessed portion 44 is a hardtop detecting switch 45 for detecting attachment of the hardtop 14 to the vehicle body 11 to inhibit an operation of the electric motor 81. The rear receiving portion 27 is mounted to the vehicle body 11 through bolts 46. A movable arm 45a is provided for turning the switch 45 on. Wires 47, 47 are connected to a control unit 83 (shown in FIG. 7) for controlling the roof 13 in a manner as set forth later.

The rear locking mechanism 37 includes a mounting bracket 51 attached to the side portion 32 of the hardtop 14, a base plate 53 mounted to the bracket 51 by means of bolts 52, 52, a lock operating portion 54 rotatably attached to the base plate 53, and a downwardly projecting pin 55 disposed closely to the lock operating portion 54.

The lock operating portion 54 includes a lock pin 57 to be inserted into the lock hole 42 of the rear receiving portion 27, as shown by an arrow of FIG. 3. The lock pin 57 includes a horizontal pin 58 extending through a lower part thereof, and a handle 61 mounted at an upper part thereof.

The pin 55, when inserted into the longitudinal hole 43 of the rear receiving portion 27 as shown by an arrow of FIG. 3, presses the movable arm 45a downwardly to thereby turn the switch 45 on.

The horizontal pin 58 has its opposite end portions to be fitted into the grooves 42a, 42a of the rear receiving portion 27.

Turning the handle 61 in a direction as indicated by an arrow causes the lock pin 57 and the horizontal pin 58 to rotate together, as indicated by an arrow.

Figures 4A, 4B:
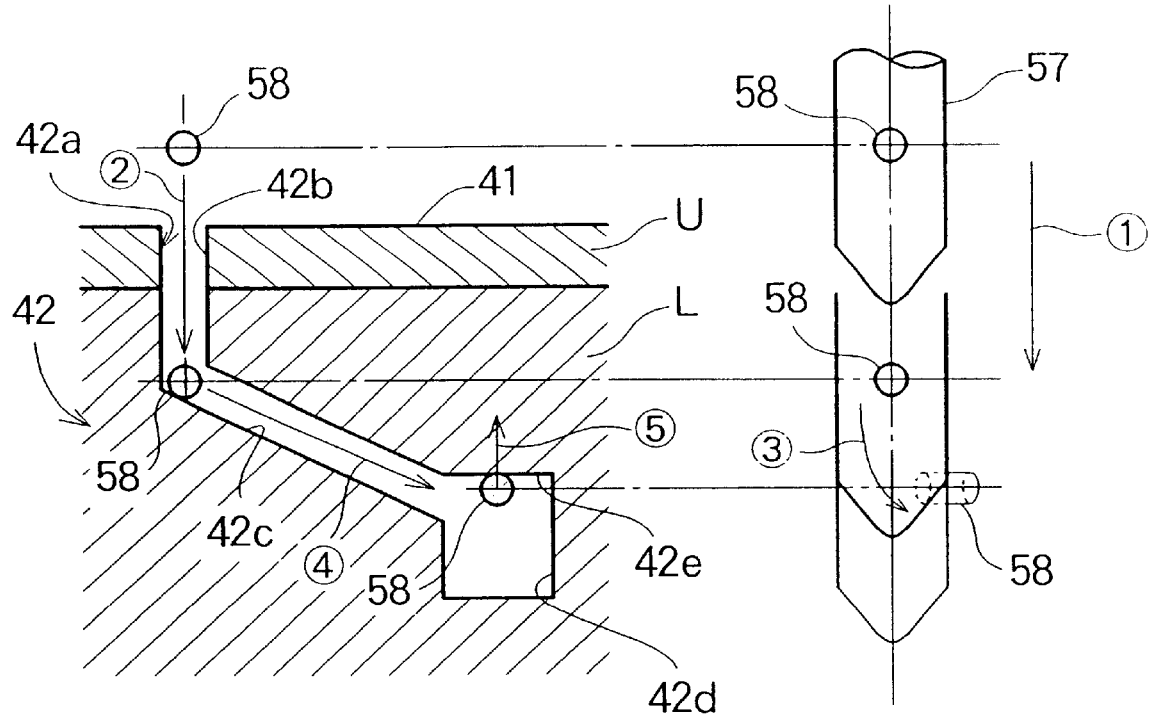
FIG. 4A illustrates a relation between a groove formed in the rear receiving portion and a horizontal pin of a lock pin of the rear locking mechanism.
FIG. 4B illustrates the lock pin having the horizontal pin to be inserted into the groove shown in FIG. 4A.

FIG. 4A shows the groove 42a and the horizontal pin 58 while FIG. 4B shows the lock pin 57 with the horizontal pin 58 extending therethrough. The horizontal pin 58 shown in FIG. 4B projects from one side of the lock pin 57 for simplicity. As can be seen from FIGS. 4A and 4B, the horizontal pin 58 shown in FIG. 4A corresponds in level to that shown in FIG. 4B.

As shown in FIG. 4A, the groove 42a is comprised of a longitudinal groove portion 42b extending downwardly from the coupling surface 41, an inclined groove portion 42c extending obliquely downwardly from a lower end portion of the longitudinal groove portion 42b, and a groove end portion 42d provided at an end portion of the inclined groove portion 42c. The groove end portion 42d includes an upper surface 42e.

Discussion will be made as to how each end portion of the horizontal pin 58 moves within the groove 42a.

As the lock pin 57 is lowered for insertion into the lock hole 42, as shown by an arrow ① of FIG. 4B, each end portion of the horizontal pin 58 is also lowered to the lower and portion of the longitudinal groove portion 42b, as indicated by an arrow ② of FIG. 4A. At this time, the handle 61 is in an unlocked position, as shown by a solid line of FIG. 3.

When the lock pin 57 is rotated with the end portion of the horizontal pin 58 disposed at the lower end portion of the longitudinal groove portion 42b, as shown by an arrow ③ of FIG. 4B, the end portion of the horizontal pin 58 moves along the inclined groove portion 42c, as indicated by an arrow ④ of FIG. 4A. In other words, the lock pin 57 and the horizontal pin 58 are lowered while rotating.

The end portion of the horizontal pin 58 moves into the groove end portion 42d, whereupon the lock pin 57 is subjected to an upward force as set forth later to thereby press the end portion of the horizontal pin 58 against the upper surface 42e of the groove end portion 42d, as indicated by an arrow ⑤.

It Is therefore unlikely that the lock pin 57 comes out of the lock hole 42. The lock pin 57 is thus locked. This means that the rear locking mechanism 37 is locked. At this time. the handle 61 is in a locked position, as shown by a phantom line of FIG. 3.

The rear receiving portion 27 is formed of an upper layer U and a lower layer L. The upper layer U including the coupling surface 41 is made of light alloy material. The lower layer L is made of iron-based material of high wear resistance or stainless steel etc.

Figure 5:
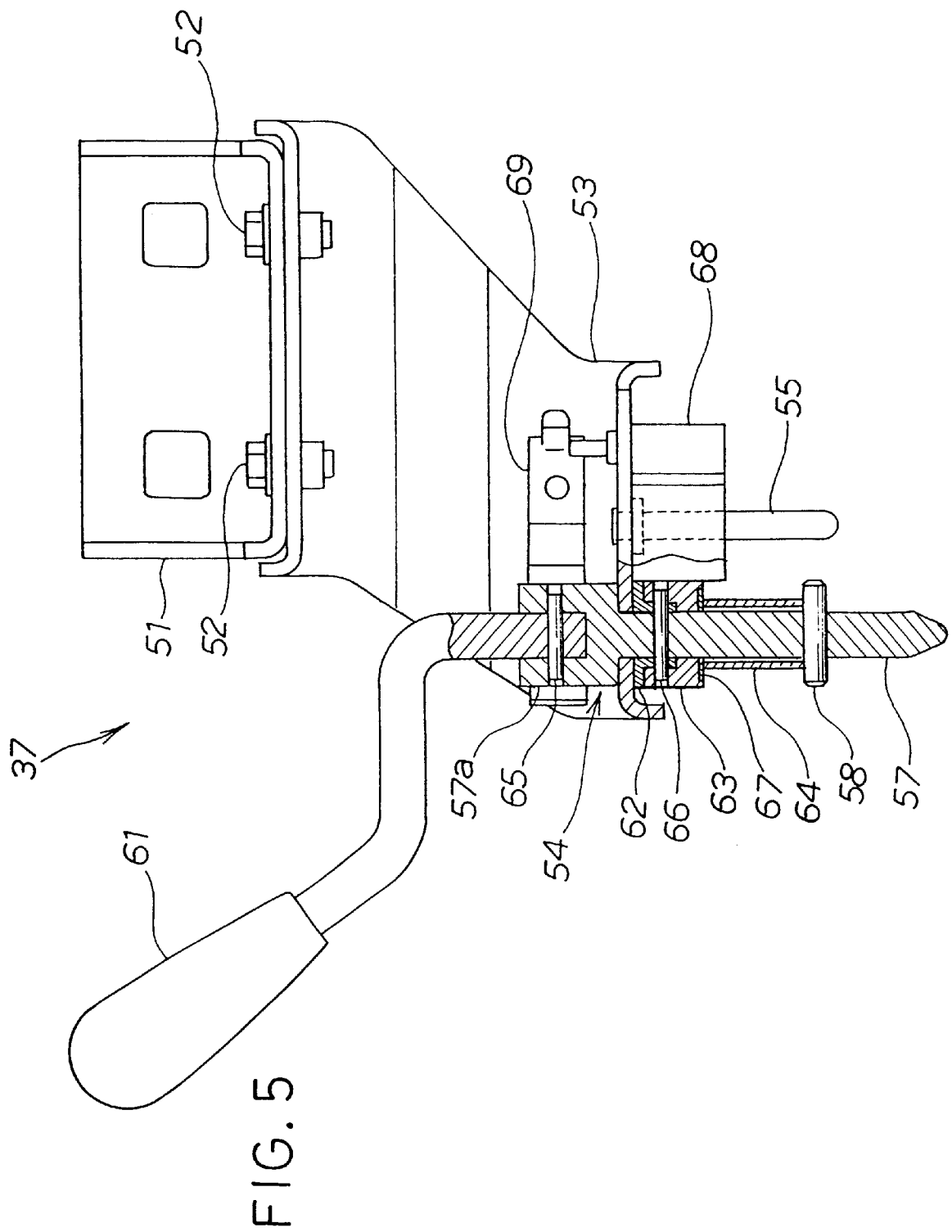
FIG. 5 is a cross-sectional view of a lock operating portion of the rear locking mechanism of the hardtop.

Reference is made to FIG. 5. In addition to the lock pin 57, the horizontal pin 58, and the handle 61, the lock operating portion 54 also includes an upper collar 62 positioned underneath the base plate 53, a stopper member 63 positioned underneath the upper collar 62, and a lower collar 64 interposed between the stopper member 63 and the horizontal pin 58. The handle 61 is fixed to the lock pin 57 by means of a pin 65. The upper collar 62 and the stopper member 63 are secured to the lock pin 57 through a pin 66. Interposed between the stopper member 63 and the lower collar 64 is a washer 67.

The lock operating portion 54 is rotatable mounted on the base plate 53 with an enlarged diameter portion 57a of the lock pin 57 and the upper collar 62 sandwiching the base plate 53 therebetween.

The stopper member 63 is to be pressed against the coupling surface 41 of the rear receiving portion 27 (shown in FIG. 3) with the washer disposed therebetween. The stopper member 63 is slightly deformed when the lock pin 57 is locked. Thus, the rear locking mechanism 37 is not likely to rattle.

A cushion member 68 is attached to a lower end portion of the base plate 53. As the rear locking mechanism 37 is locked with the cushion member 68 pressed against the coupling surface 41 of the rear receiving portion 27, the cushion member 68 is in a compressed position to thereby produce the above-mentioned upward force. The locked rear locking mechanism 37 is thus urged upwardly by such an upward force. It is therefore unlikely that the rear locking mechanism 37 rattles.

Referring back to FIG. 3, reference numeral 69 denotes a leaf spring. The enlarged diameter portion 57a of the lock pin 57 has flat surface portions 57b, 57c formed thereon. When the leaf spring 69 abuts on the flat surface portion 57b, the handle 61 is held in the unlocked position. When the leaf spring 69 abuts on the flat surface portion 57c, the handle 61 is held in the locked position.

Figure 6:
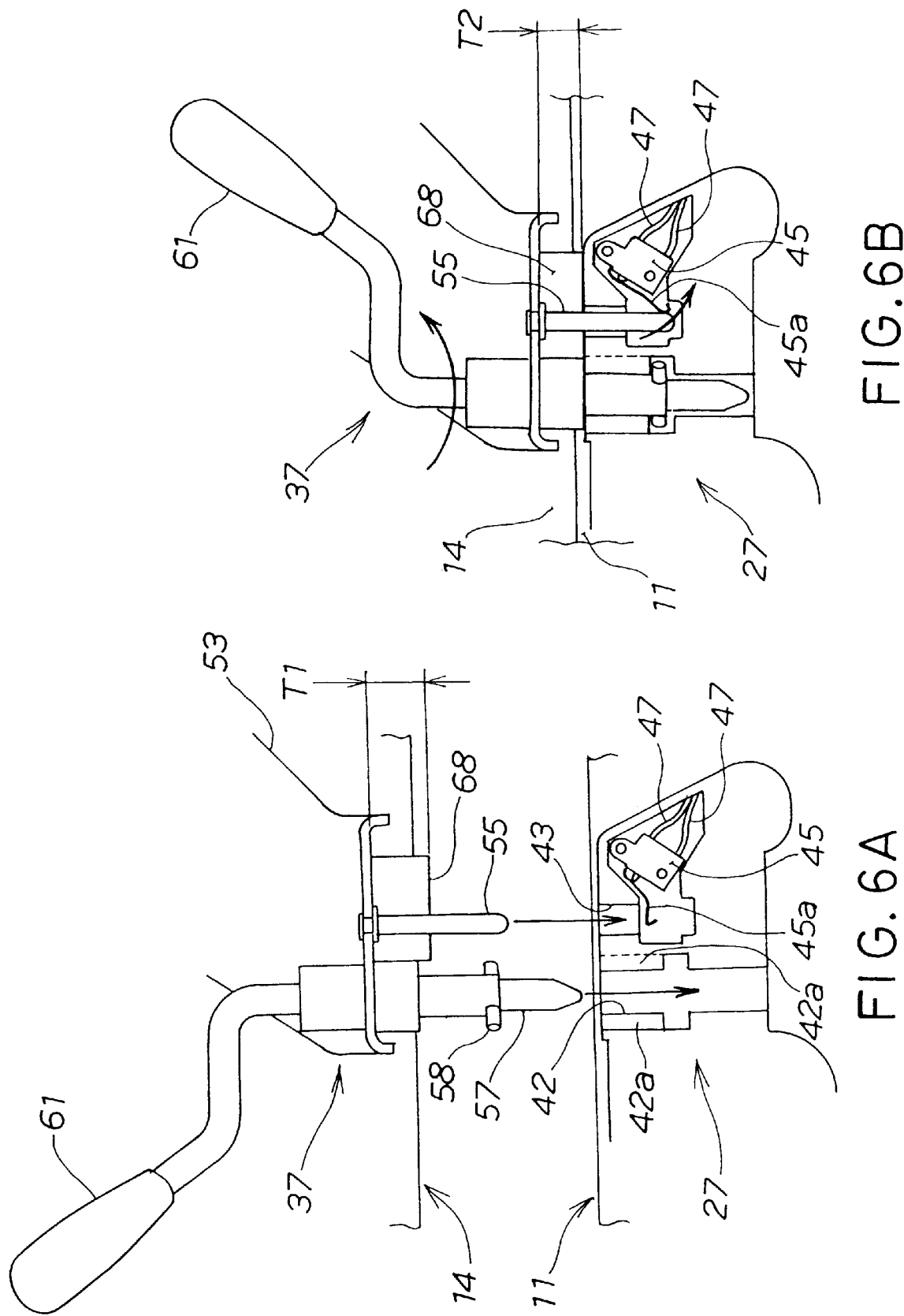
FIG. 6 shows how the rear locking mechanism of the hardtop is coupled to the rear receiving portion of the vehicle.

Referring to FIG. 2 and FIGS. 6A and 6B, discussion will be made as to how the hardtop 14 is attached to the vehicle body 11.

The hardtop 14 is carried over the convertible 14 to bring the front locking mechanisms 34, 34 of the hardtop 14 into vertical alignment with the front receiving portions 25, 25 of the windshield 12 and to bring the rear locking mechanisms 36, 37 of the hardtop 14 into vertical alignment with the rear receiving portions 26, 27, as shown in FIG. 2.

The hardtop 14 is then lowered, as shown by arrows of FIG. 2, to thereby couple the front locking mechanisms 34, 34 to the front receiving portions 25, 25. The front locking mechanisms 34, 34 are thus locked.

The lock pin 57 of the rear locking mechanism 37 is inserted into the lock hole 42 of the rear receiving portion 27, as shown by an arrow of FIG. 6A while the pin 55 of the rear locking mechanism 37 is inserted into the longitudinal hole 43 of the rear receiving portion 27, as shown by an arrow of FIG. 6A. At this time, the handle 61 is in the unlocked position.

The handle 61 is then rotated from the unlocked position towards the locked position, as shown by an arrow of FIG. 6B. The rotation of the handle 61 causes the horizontal pin 58 to move in accordance with the manner as described in relation to FIGS. 4A and 4B. Thus, the lock pin 57 moves downwardly, as shown in FIG. 6B. During the downward movement of the lock pin 57, a rear part of the hardtop 14 is lowered, whereupon the pin 55 of the rear locking mechanism 37 swings the movable arm 45a of the hardtop detecting switch 45 mounted on the rear receiving portion 27, as shown by an arrow of FIG. 6B.

When the handle 61 arrives in the locked position, the rear locking mechanism 37 is locked or coupled to the rear receiving portion 27 while the movable arm 45a swung in the above-stated manner turns the switch 45 on.

The hardtop detecting switch 45 then provides a signal to the control unit 83 through the wires 47, 47. As the control unit 83 is provided with such a signal, no current is supplied to the electric motor 81. This means that the electric motor 81 is out of operation even when an unfolding switch 85 (shown in FIG. 8) for operating the electric motor 81 to unfold the roof 13 is accidentally turned on. Thus, since the electric motor 81 does not operate, the roof 13 is not unfolded, either.

It thus becomes possible to prevent the failure of the electric motor 81.

When the handle 61 is rotated to the locked position, as described above, the cushion member 68 of the rear locking mechanisms 37 is compressed, such that the thickness of the cushion member 68 is varied from a thickness T1 shown in FIG. 6A to a thickness T2 shown in FIG. 6B. The cushion member 68 thus compressed produces a resilient force or the upward force. With this resilient force, the rear locking mechanism 37 is urged upwardly. It is thus unlikely that the rear locking mechanism 37 rattles.

Figure 7:
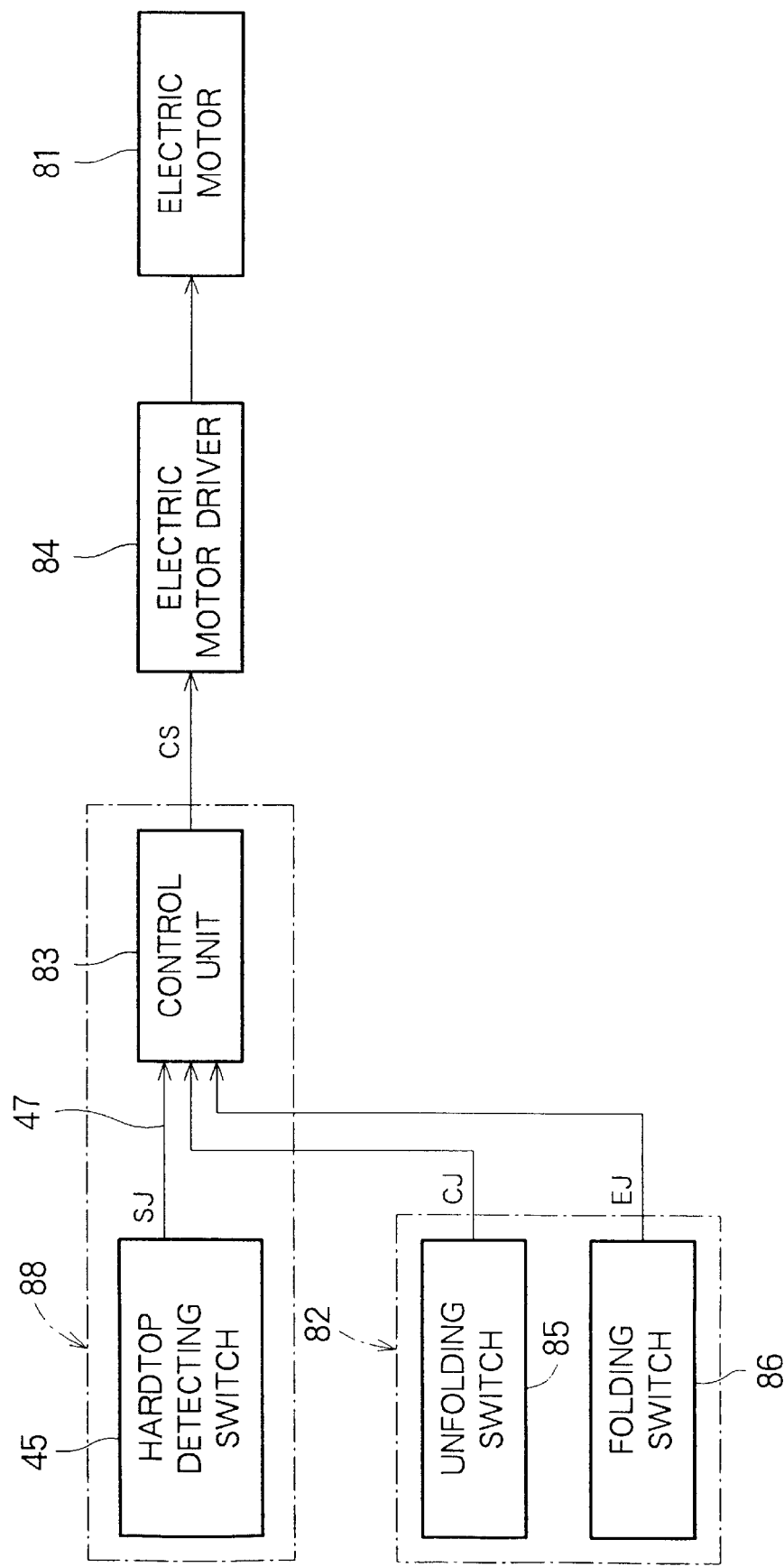
FIG. 7 is a block diagram of a device for folding and unfolding the electric folding roof of the vehicle.

Reference is made to FIG. 7. A device 80 for folding and unfolding the roof 13 includes the electric motor 81 for driving the link device disposed inside the roof 13, the aforementioned hardtop detecting switch 45, a switch 82 for folding and unfolding the roof 13, the control unit 83 for controlling the operation of the electric motor 81 on the basis of detection information SJ supplied from the switch 45 or closing and opening information CJ, EJ supplied from the switch 82, and an electric motor driver 84 for driving or operating the electric motor 81 on the basis of a control signal CS supplied from the control unit 83 thereto.

When the hardtop 14 is attached to the vehicle body 11, the switch 45 is turned on to thereby provide the control unit 83 with the detection information SJ indicating that the hardtop 14 is attached to the vehicle body 11.

The switch 82 includes the unfolding switch 85 for unfolding the rood 13 folded and housed in the vehicle body 11, and a folding switch 86 for folding down the roof 13 unfolded or connected at its front end portion to the upper end portion of the windshield 12.

The unfolding switch 85, when turned on, provides the control unit 83 with the closing information CJ to unfold the roof 13. The folding switch 86, when turned on, provides the control unit 83 with the opening information EJ to fold down the roof 13, such that the folded roof 13 is housed in the vehicle body 11.

The control unit 83, when received the detection information SJ from the switch 45, does not supply the control signal CS to the electric motor driver 84 regardless of whether the closing information CJ is supplied thereto or not. The electric motor 81 is therefore inhibited from operating.

When the control unit 83 does not receive the detection information SJ from the switch 45, the control unit 83 supplies the electric motor driver 84 with the control signal CS for operating the electric motor 81 on the basis of the closing information CJ from the unfolding switch 85 or the opening information EJ from the folding switch 86.

On the basis of the control signal CS supplied from the control unit 83, the electric motor driver 84 drives or operates the electric motor 81.

The hardtop detecting switch 45 and the control unit 83 jointly constitute an inhibiting means 88.

Figure 8:
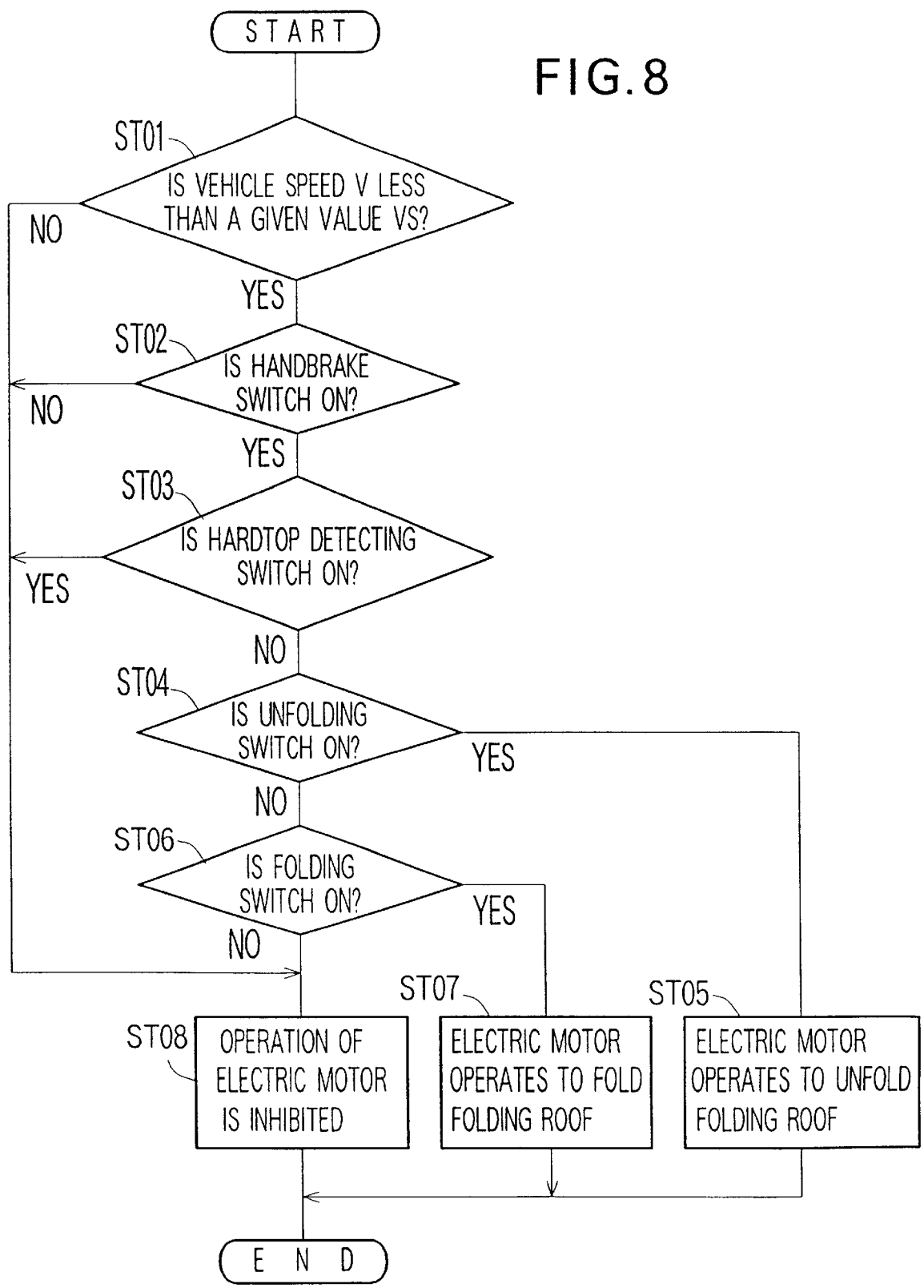
FIG. 8 is a flow chart showing an operation of the device shown in FIG. 7.
Figure 9:
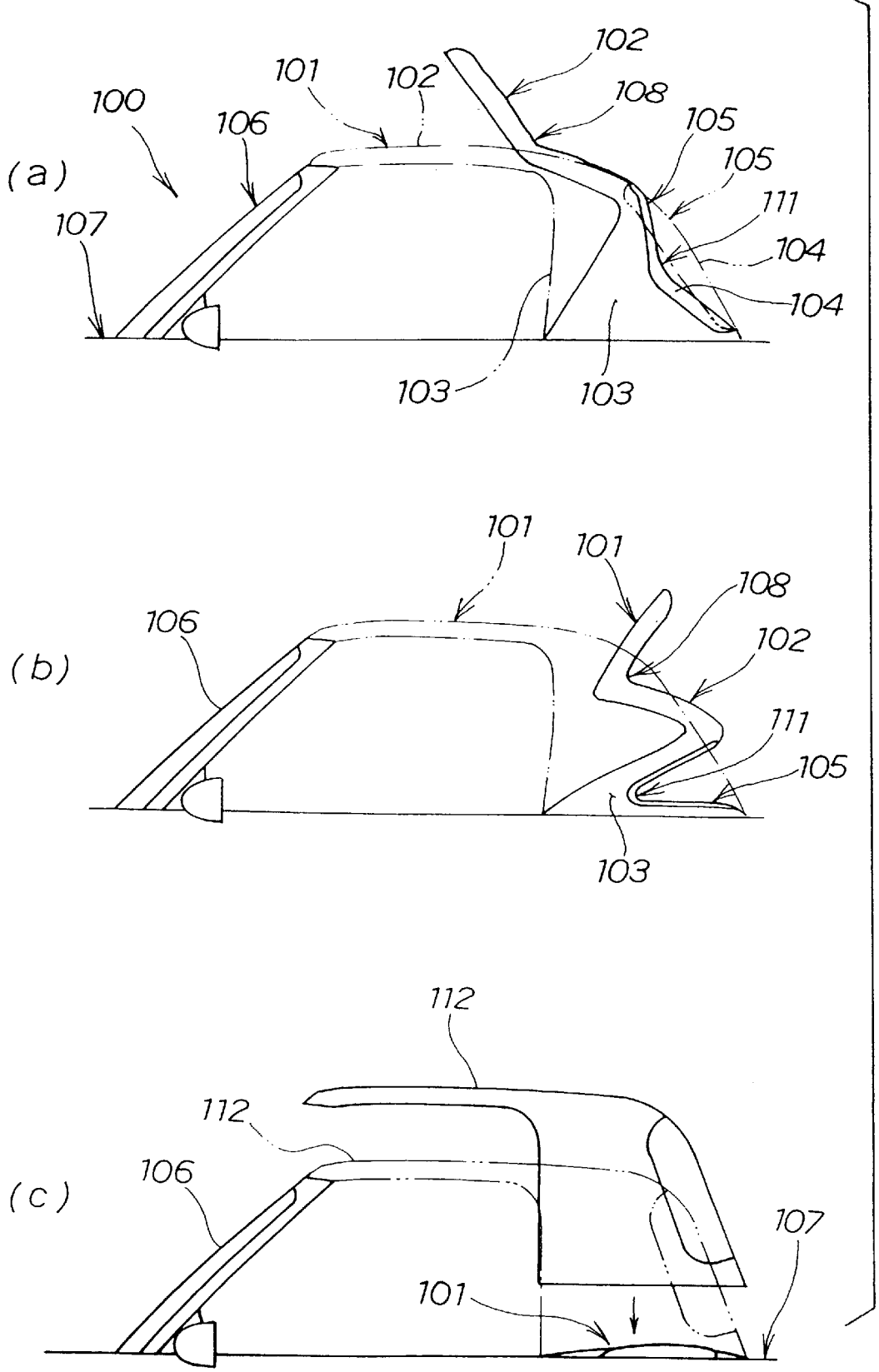
FIG. 9 shows how a conventional electric folding roof is folded and housed in the vehicle body of a convertible.

Operation of the device 80 will be described with reference to FIG. 8.

In STEP (hereinafter simply "ST") 01: A vehicle speed V of the convertible 10 is detected by a vehicle wheel speed sensor (not shown), and determination is made as to whether the detected speed V is less than a given value VS (for example 3 km/h).

When the speed V is less than the value VS (i.e., when it is YES), the operation proceeds to ST02.

When the speed V is equal to or greater than the value VS (i.e., when it is NO), the operation proceeds to ST08.

ST02: Determination is made as to whether a handbrake switch (not shown) is ON.

When the handbrake switch is ON (when it is YES), the operation proceeds to ST03.

When the handbrake switch is OFF (when it is NO), the operation proceeds to ST08.

ST03: Determination is made as to whether the hardtop detecting switch 45 is ON (that is, the hardtop 14 is attached to the vehicle body 11).

When the hardtop detecting switch 45 is OFF (when it is NO), the operation proceeds to ST04.

When the hardtop detecting switch 45 is ON (when it is YES), the operation proceeds to ST08.

ST04: Determination is made as to whether the unfolding switch 85 is ON.

When the unfolding switch 85 is OFF (when it is NO), the operation proceeds to ST06.

When the unfolding switch 85 is ON (when it is YES), the operation proceeds to ST05.

ST05: The electric motor 81 operates to drive the link device to thereby unfold the roof 13. The passenger compartment of the convertible 10 is thus closed.

ST06: Determination is made as to whether the folding switch 86 is ON.

When the folding switch 86 is ON (when it is YES), the operation proceeds to ST07.

When the folding switch 86 is OFF (when it is NO), the operation proceeds to ST08.

ST07: The electric motor 81 operates to drive the link device to thereby fold the roof 13, such that the folded roof 13 is housed in the vehicle body 11. As a result, the passenger compartment of the convertible 10 is opened ST08: The electric motor 81 is inhibited from operating.

It is therefore unlikely that the roof 13 is unfolded even when the unfolding switch 85 is accidentally turned on with the hardtop 14 attached to the vehicle body 11.

The vehicle speed V is detected by the vehicle wheel speed. sensor (not shown) provided at the vehicle body 11. The operation of the electric motor 81 requires the speed V less than the given value VS.

The handbrake switch is mounted to a handbrake lever (not shown) of the vehicle body 11. The handbrake switch is turned on when the handbrake lever is pulled upwardly. The operation of the electric motor 81 requires the handbrake lever to be pulled upwardly.

Further, when the folding switch 86 or the unfolding switch 85 is turned on, the control unit 83 may provide a signal for lowering power windows mounted in the doors 18, 18 to an electric motor driver (not shown) for the power windows before the electric motor 81 operates to fold or unfold the roof 13. With this arrangement, it becomes possible to lower the power windows before the roof 13 is folded or unfolded.

Furthermore, when the hardtop 14 is attached to the vehicle body 11, the inhibiting means 88 also inhibits the control unit 83 from supplying the electric motor driver for power windows with the signal for lowering the power windows. It is thus unlikely that the power windows are lowered with the hardtop 14 attached to the vehicle body 11.

The inhibiting means 88 has been described which employs the hardtop detecting switch 45 as shown in FIG. 3, however, it may include other switches such as a push-type switch, a proximity switch, or a photoswitch that is turned on when provided with light or no light.

Obviously, various minor changes and modifications of the present invention are possible in the light of the above teaching. It is therefore to be understood that within the scope of the appended claims, the invention may be practiced otherwise than as specifically described.

What is claimed is:

1. A vehicle comprising:

a vehicle body;

an electric folding roof housed in said vehicle body in a folded state;

an electric motor being operable to unfold said folded electric folding roof;

a rigid roof designed to be attached to said vehicle body when said electric folding roof is folded and housed in said vehicle body, said rigid roof having a ceiling portion, side portions and a rear portion;

rear locking mechanisms provided on said side portions of said rigid roof;

rear receiving portions mounted to said vehicle body, said rear receiving portions being coupled to said rear locking mechanisms; and an inhibiting means for inhibiting an operation of said electric motor upon detection of the attachment of said rigid roof to said vehicle body, said inhibiting means including a pair of hardtop detecting switches, said rear locking mechanisms functioning said hardtop detecting switches when said rear locking mechanisms are received in locking relationship by said rear receiving portions; wherein said hardtop detecting switches detect when said rigid roof is attached to said vehicle body.

2. A vehicle according to claim 1, wherein said hardtop detecting switches output a detection signal, and wherein said inhibiting means includes a control unit for controlling, on the basis of said detection signal fed from said hardtop detecting switches, said electric motor such that said motor does not operate.

3. A vehicle according to claim 1, wherein said hardtop detecting switches are designed to be turned on by the attachment of said rigid roof to said vehicle body.

* * * * *